(12) United States Patent
Fletcher et al.

(10) Patent No.: US 12,474,772 B2
(45) Date of Patent: Nov. 18, 2025

(54) EYE TRACKING

(71) Applicant: Valve Corporation, Bellevue, WA (US)

(72) Inventors: Evan Fletcher, Carnation, WA (US); Scott Nietfeld, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 34 days.

(21) Appl. No.: 18/416,582

(22) Filed: Jan. 18, 2024

(65) Prior Publication Data

US 2025/0238076 A1   Jul. 24, 2025

(51) Int. Cl.
*G06F 3/01* (2006.01)
*G02B 27/01* (2006.01)
*G06V 10/141* (2022.01)

(52) U.S. Cl.
CPC ......... *G06F 3/013* (2013.01); *G02B 27/0172* (2013.01); *G06F 3/012* (2013.01); *G06V 10/141* (2022.01)

(58) Field of Classification Search
CPC ..... G06F 3/013; G06F 3/012; G02B 27/0172; G06V 10/141
See application file for complete search history.

(56) References Cited

U.S. PATENT DOCUMENTS

| | | | | |
|---|---|---|---|---|
| 10,871,823 B1 * | 12/2020 | Burgess | | G06T 7/246 |
| 11,269,402 B1 * | 3/2022 | Canberk | | G06F 3/04815 |
| 2016/0166146 A1 * | 6/2016 | Sarkar | | G02B 26/101 |
| | | | | 351/210 |
| 2016/0202757 A1 * | 7/2016 | Miao | | G06V 40/193 |
| | | | | 348/78 |
| 2017/0090562 A1 * | 3/2017 | Gustafsson | | G06F 3/0304 |
| 2017/0352183 A1 * | 12/2017 | Katz | | G06T 19/006 |
| 2018/0284887 A1 * | 10/2018 | Fan | | G06F 3/038 |
| 2019/0204913 A1 * | 7/2019 | Sarkar | | G02B 27/0093 |
| 2021/0142508 A1 * | 5/2021 | Azimi | | G02B 27/017 |
| 2022/0050522 A1 * | 2/2022 | Krukowski | | G02B 27/0093 |
| 2023/0393653 A1 * | 12/2023 | Chernyak | | G06F 3/013 |
| 2024/0028116 A1 * | 1/2024 | Yang | | G02B 27/0172 |
| 2024/0353921 A1 * | 10/2024 | Hudman | | A63F 13/837 |
| 2025/0054464 A1 * | 2/2025 | Connor | | G06V 10/141 |

OTHER PUBLICATIONS

PCT/US2025/011718, "International Search Report and Written Opinion", Mar. 24, 2025, 12 pages.

* cited by examiner

*Primary Examiner* — John R Schnurr
(74) *Attorney, Agent, or Firm* — Kilpatrick Townsend & Stockton LLP

(57) ABSTRACT

Calibration for eye tracking calibration in a head-mounted display can refined during use by tracking head rotation of a user during a time period while the head-mounted display is worn by the user, tracking eye rotation of the user during the time period, comparing the eye rotation of the user to the head rotation of the user during the time period, and refining a calibration state of eye tracking for the head-mounted display based on comparing the eye rotation of the user to the head rotation of the user during the time period.

20 Claims, 13 Drawing Sheets

EYE TRACKING

BACKGROUND

The following disclosure generally relates to head-mounted displays. A head-mounted display (HMD) is an electronic device or system worn on a user's head and, when worn, secures at least one electronic display within a viewable field of at least one of the user's eyes, regardless of a position or orientation of the user's head. An HMD used to implement virtual reality (VR) typically envelop a wearer's eyes completely and substitute a "virtual" reality for an actual view (or actual reality) in front of the user. An HMD for augmented reality (AR) can provide a semi-transparent or transparent overlay of one or more screens in front of a wearer's eyes such that an actual view is augmented with additional information. In some AR devices, the "display" component of an HMD can be transparent or at a periphery of the user's field of view so that it does not completely block the user from being able to see their external environment. In some AR devices, a display overlays digital content on a video feed from a camera acquiring images of a real scene. Mixed Reality (MR) is an interaction between a digital and the physical world. Extended Reality (ER) can be used to refer to VR, AR, and/or MR.

BRIEF SUMMARY

This disclosure generally relates to head-mounted displays, and, without limitation, to eye tracking in a head-mounted display.

In some embodiments, a system for automatic field calibration for eye tracking in a head-mounted display comprises the head-mounted display; an eye-tracking assembly that is part of the head-mounted display; and/or one or more memory devices comprising instructions. The instructions, when executed, cause one or more processors to perform operations comprising: tracking head rotation of a user during a time period while the head-mounted display is worn by the user; tracking eye rotation of the user during the time period, using the eye-tracking assembly; comparing the eye rotation of the user to the head rotation of the user during the time period; and/or refining a calibration state of eye tracking for the head-mounted display based on comparing eye rotation of the user to head rotation of the user during the time period. In some embodiments, the system comprises an inertial measurement unit that is part of the head-mounted display; tracking the head rotation is based on data received from the inertial measurement unit; the head rotation is measured using an inertial measurement unit in the head-mounted display; the eye rotation is measured by estimating gaze direction from images acquired by a camera; refining the calibration state is based on a comparison of closeness of eye rotation equaling the negative of the head rotation; the instructions, when executed, cause the one or more processors to perform operations comprising: illuminating an eye, using a light source mounted in the head-mounted display, acquiring an image of the eye, using a camera mounted in the head-mounted display, while the eye is illuminated using the light source, comparing the image of the eye to a model, and/or estimating a gaze direction of the eye in relation to the head-mounted display based on comparing the image of the eye to the model; the camera images light from the light source in the infrared; an optical axis of the camera is parallel to an optical axis of light source; the instructions, when executed, cause the one or more processors to perform operations comprising: rendering a plurality of images on the head-mounted display, tracking head movement of the user wearing the head-mounted display, in response to the plurality of images presented, tracking eye movement of the user in response to the plurality of images presented, predicting a future gaze direction of the user, and/or a future head orientation of the user, based on tracking the head movement of the user and tracking the eye movement of the user in response to the plurality of images presented, and/or rendering an image on the head-mounted display based on the future gaze direction and/or based on the future head orientation predicted.

In some embodiments, a method for automatic field calibration for eye tracking in a head-mounted display comprises tracking head rotation of a user during a time period while the head-mounted display is worn by the user; tracking eye rotation of the user during the time period; comparing the eye rotation of the user to the head rotation of the user during the time period; and/or refining a calibration state of eye tracking for the head-mounted display based on comparing eye rotation of the user to head rotation of the user during the time period. In some embodiments, the head rotation is measured using an inertial measurement unit in the head-mounted display; the eye rotation is measured by estimating gaze direction from images acquired by a camera; refining the calibration state is based on a comparison of closeness of eye rotation equaling the negative of the head rotation; the method comprises illuminating an eye, using a light source mounted in the head-mounted display, acquiring an image of the eye, using a camera mounted in the head-mounted display, while the eye is illuminated using the light source, comparing the image of the eye to a model, and/or estimating a gaze direction of the eye in relation to the head-mounted display based on comparing the image of the eye to the model; the model is a machine-learning model; the camera images light from the light source in the infrared; an optical axis of the camera is parallel to an optical axis of light source; an optical axis of the camera is a straight line to the eye; the method comprises rendering a plurality of images on the head-mounted display, tracking head movement of the user wearing the head-mounted display, in response to the plurality of images presented, tracking eye movement of the user in response to the plurality of images presented, predicting a future gaze direction of the user, and/or a future head orientation of the user, based on tracking the head movement of the user and tracking the eye movement of the user in response to the plurality of images presented, and/or rendering an image on the head-mounted display based on the future gaze direction and/or based on the future head orientation predicted.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
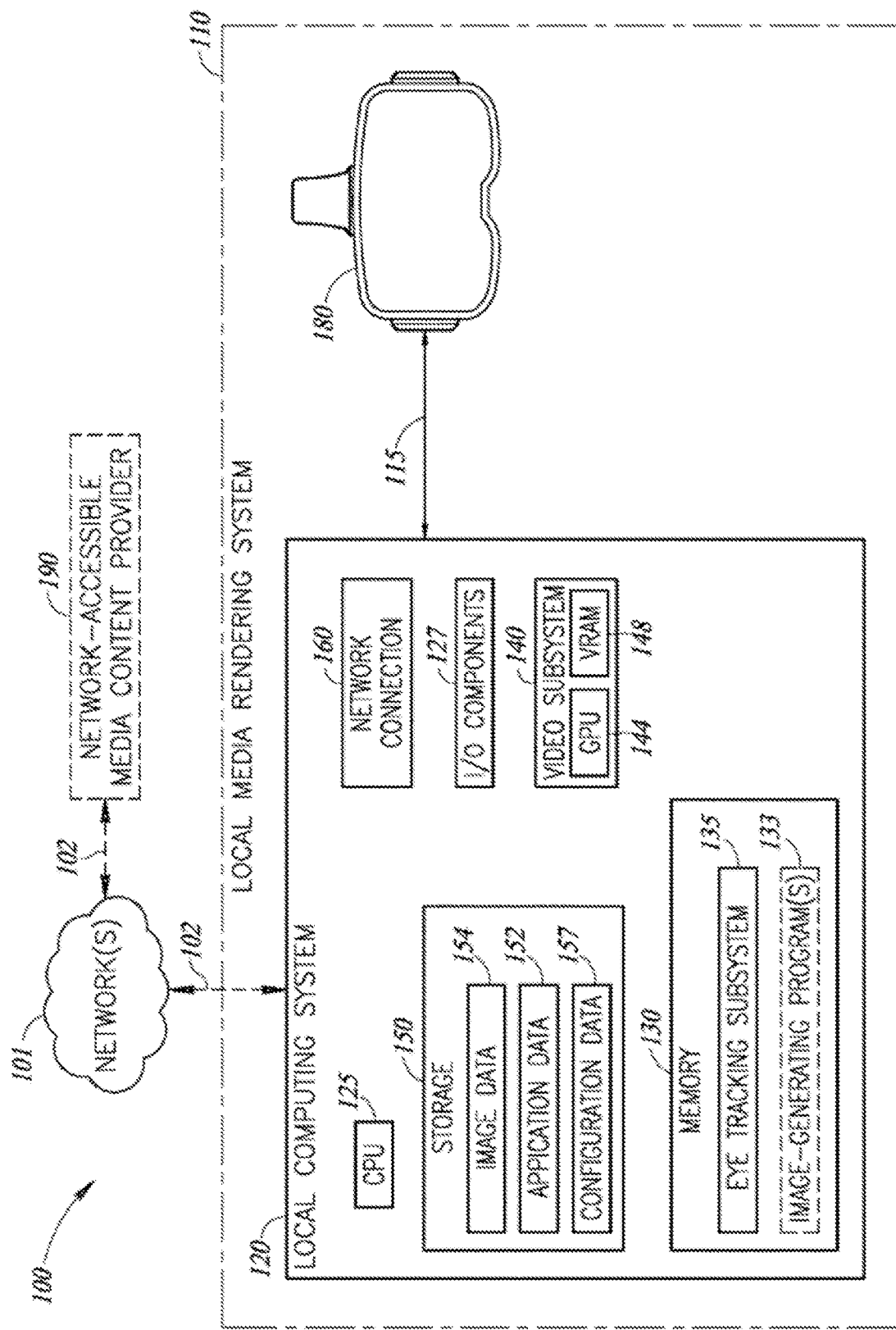
FIG. 1 is a schematic diagram of an embodiment of a networked environment of a head-mounted display (HMD).

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

For illustrative purposes, some embodiments are described below in which specific types of information are acquired and used in specific types of ways for specific types of structures and by using specific types of devices. However, it will be understood that such described techniques may be used in other manners in other embodiments, and that the present disclosure is thus not limited to the exemplary details provided. As a non-exclusive example, some embodiments include the use of images that are video frames. While an example may refer to a "video frame" for convenience, it will be appreciated that the techniques described with the example may be employed with respect to one or more images of various types, including non-exclusive examples of multiple video frames in succession (e.g., at 30, 60, 90, 180 or some other quantity of frames per second), other video content, photographs, computer-generated graphical content, other articles of visual media, or some combination thereof. Additionally, various details are provided in the drawings and text for exemplary purposes and are not intended to limit the scope of the present disclosure.

Figure 2:
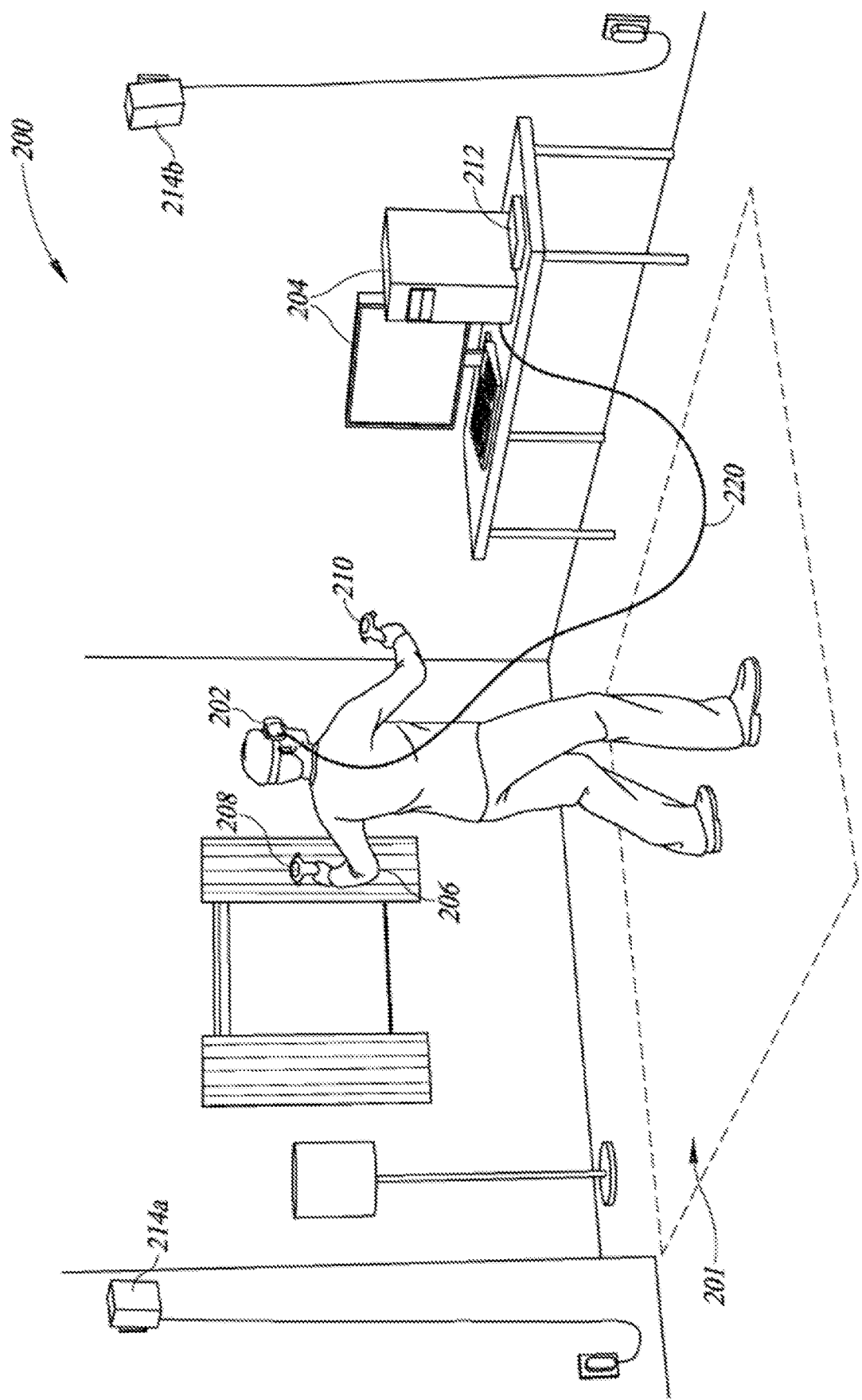
FIG. 2 is a diagram illustrating an embodiment of an environment for using an HMD.

FIG. 1 is a schematic diagram of an embodiment of a networked environment 100. The networked environment 100 includes a local media rendering (LMR) system 110 (e.g., a gaming system), which includes a local computing system 120 and display device 180 (e.g., an HMD device with two display panels). In FIG. 1, the local computing system 120 is communicatively connected to display device 180 via transmission link 115 (which may be wired or tethered, such as via one or more cables as illustrated in FIG. 2 (cable 220), or instead may be wireless). In some embodiments, the local computing system 120 may provide encoded image data for display to a panel display device (e.g., a TV, console or monitor) via a wired or wireless link, whether in addition to or instead of the HMD device 180, and the display devices each includes one or more addressable pixel arrays. In some embodiments, the local computing system 120 may include a computing system; a gaming console; a video stream processing device; a mobile computing device (e.g., a cellular telephone, PDA, or other mobile device); a VR or AR processing device; or other computing system.

A pixel is the smallest addressable image element of a display that may be activated to provide a color value. In some cases, a pixel includes individual respective sub-elements (in some cases as separate "sub-pixels") for separately producing red, green, and blue light for perception by a human viewer, with separate color channels used to encode pixel values for the sub-pixels of different colors. A pixel value refers to a data value corresponding to respective levels of stimulation for one or more of respective RGB elements of a single pixel.

In FIG. 1, the local computing system 120 has components that include one or more hardware processors (e.g., centralized processing units, or "CPUs") 125, memory 130, various I/O ("input/output") hardware components 127 (e.g., a keyboard, a mouse, one or more gaming controllers, speakers, microphone, IR transmitter and/or receiver, etc.), a video subsystem 140 that includes one or more specialized hardware processors (e.g., graphics processing units, or "GPUs") 144 and video memory (VRAM) 148, computer-readable storage 150, and a network connection 160. An embodiment of an eye tracking subsystem 135 executes in memory 130 in order to perform one or more processes, such as by using the CPU(s) 125 and/or GPU(s) 144 to perform automated operations. The memory 130 may optionally further execute one or more other programs 133 (e.g., to generate video or other images to be displayed, such as a game program). As part of the automated operations, the eye tracking subsystem 135 and/or programs 133 executing in memory 130 may store or retrieve various types of data, including in the example database data structures of storage 150, in this example, the data used may include various types of image data information in database ("DB") 154, various types of application data in DB 152, various types of configuration data in DB 157, and may include additional information, such as system data or other information.

The LMR system 110 is communicatively connected via one or more computer networks 101 and network links 102 to an exemplary network-accessible media content provider 190 that may further provide content to the LMR system 110 for display, whether in addition to or instead of the image-generating programs 133. The media content provider 190 may include one or more computing systems (not shown)

that may each have components similar to those of local computing system 120, including one or more hardware processors, I/O components, local storage devices and memory, although some details are not illustrated for the network-accessible media content provider for the sake of brevity.

It will be appreciated that, while the display device 180 is depicted as being distinct and separate from the local computing system 120 in FIG. 1, in some embodiments, some or all components of the local media rendering system 110 may be integrated or housed within a single device, such as a mobile gaming device, portable VR entertainment system, HMD device, etc. In some embodiments, transmission link 115 may, for example, include one or more system buses and/or video bus architectures.

As one example involving operations performed locally by the local media rendering system 120, assume that the local computing system is a gaming computing system, such that application data 152 includes one or more gaming applications executed via CPU 125 using memory 130, and that various video frame display data is generated and/or processed by the image-generating programs 133, such as in conjunction with GPU 144 of the video subsystem 140. In order to provide a quality gaming experience, a high volume of video frame data (corresponding to high image resolution for each video frame, as well as a high "frame rate" of approximately 60-180 of such video frames per second) is generated by the local computing system 120 and provided via the wired or wireless transmission link 115 to the display device 180.

It will also be appreciated that computing system 120 and display device 180 are merely illustrative and are not intended to limit the scope of the present disclosure. The computing system 120 may instead include multiple interacting computing systems or devices, and may be connected to other devices that are not illustrated, including through one or more networks such as the Internet, via the Web, or via private networks (e.g., mobile communication networks, etc.). More generally, a computing system or other computing node may include any combination of hardware or software that may interact and perform the described types of functionality, including, without limitation, desktop or other computers, game systems, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. The display device 180 may similarly include one or more devices with one or more display panels of various types and forms, and optionally include various other hardware and/or software components.

In addition, the functionality provided by the eye tracking subsystem 135 may, in some embodiments, be distributed in one or more components, and in some embodiments some of the functionality of the eye tracking subsystem 135 may not be provided and/or other additional functionality may be available. It will also be appreciated that, while various items are illustrated as being stored in memory or on storage while being used, these items or portions of them may be transferred between memory and other storage devices for purposes of memory management or data integrity. Thus, in some embodiments, techniques may be performed by hardware that include one or more processors or other configured hardware circuitry or memory or storage, such as when configured by one or more software programs (e.g., by the eye tracking subsystem 135 or it components) and/or data structures (e.g., by execution of software instructions of the one or more software programs and/or by storage of such software instructions and/or data structures). Some or all of the components, systems, and/or data structures may be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in some embodiments.

FIG. 2 illustrates an embodiment of an environment 200 used with an example HMD device 202 that is coupled to a video rendering computing system 204 via a tethered connection 220 (or a wireless connection in some embodiments) to provide a virtual reality display to a human user 206. The user wears the HMD device 202 and receives displayed information via the HMD device from the computing system 204 of a simulated environment different from the actual physical environment, with the computing system acting as an image rendering system that supplies images of the simulated environment to the HMD device for display to the user, such as images generated by a game program and/or other software program executing on the computing system. The user is further able to move around within a tracked volume 201 of the actual physical environment 200 in this example, and may further have one or more I/O ("input/output") devices to allow the user to further interact with the simulated environment, which in this example includes hand-held controllers 208 and 210.

In the illustrated example, the environment 200 may include one or more base stations 214 (two shown, labeled base stations 214-*a* and 214-*b*) that may facilitate tracking of the HMD device 202 or the controllers 208 and 210. As the user moves location or changes orientation of the HMD device 202, the position of the HMD device is tracked, such as to allow a corresponding portion of the simulated environment to be displayed to the user on the HMD device, and the controllers 208 and 210 may further employ similar techniques to use in tracking the positions of the controllers (and to optionally use that information to assist in determining or verifying the position of the HMD device). After the tracked position of the HMD device 202 is known, corresponding information is transmitted to the computing system 204 via the tether 220 or wirelessly, which uses the tracked position information to generate one or more next images of the simulated environment to display to the user.

There are numerous methods of positional tracking that may be used in the various implementations of the present disclosure, including, but not limited to, acoustic tracking, inertial tracking, magnetic tracking, optical tracking, combinations thereof, etc.

In some implementations, the HMD device 202 includes one or more optical receivers or sensors that may be used to implement tracking functionality or other aspects of the present disclosure. For example, the base stations 214 may each sweep an optical signal across the tracked volume 201. Depending on the requirements of each particular implementation, each base station 214 may generate more than one optical signal. For example, while a single base station 214 can be sufficient for six-degree-of-freedom tracking, multiple base stations (e.g., base stations 214 *a*, 214 *b*) may be used in some embodiments to provide robust room-scale tracking for HMD devices and/or peripherals. In this example, optical receivers are incorporated into the HMD device 202 and or other tracked objects, such as the controllers 208 and 210. In some embodiments, optical receivers may be paired with an accelerometer and gyroscope Inertial Measurement Unit ("IMU") on each tracked device to support low-latency sensor fusion.

In some implementations, each base station 214 includes two rotors that sweep a linear beam across the tracked volume 201 on orthogonal axes. At the start of each sweep cycle, the base station 214 may emit an omni-directional light pulse (referred to as a "sync signal") that is visible to sensors on the tracked objects. Thus, each sensor computes a unique angular location in the swept volume by timing the duration between the sync signal and the beam signal. Sensor distance and orientation may be solved using multiple sensors affixed to a single rigid body.

The one or more sensors positioned on the tracked objects (e.g., HMD device 202, controllers 208 and 210) may comprise an optoelectronic device capable of detecting the modulated light from the rotor. For visible or near-infrared (NIR) light, silicon photodiodes and suitable amplifier/detector circuitry may be used. Because the environment 200 may contain static and time-varying signals (optical noise) with similar wavelengths to the signals of the base stations 214 signals, in some implementations the base station light may be modulated in such a way as to make it easy to differentiate from any interfering signals, and/or to filter the sensor from any wavelength of radiation other than that of base station signals.

Inside-out tracking is also a type positional tracking that may be used to track the position of the HMD device 202 and/or other objects (e.g., controllers 208 and 210, tablet computers, smartphones). Inside-out tracking differs from outside-in tracking by the location of the cameras or other sensors used to determine the HMD's position. For inside-out tracking, the camera or sensors are located on the HMD, or object being tracked, while in outside-out tracking the camera or sensors are placed in a stationary location in the environment.

An HMD that utilizes inside-out tracking utilizes one or more cameras to "look out" to determine how its position changes in relation to the environment. When the HMD moves, the sensors readjust their place in the room and the virtual environment responds accordingly in real-time. This type of positional tracking can be achieved with or without markers placed in the environment. The cameras that are placed on the HMD observe features of the surrounding environment. When using markers, the markers are designed to be easily detected by the tracking system and placed in a specific area. With "markerless" inside-out tracking, the HMD system uses distinctive characteristics (e.g., natural features) that originally exist in the environment to determine position and orientation. The HMD system's algorithms identify specific images or shapes and use them to calculate the device's position in space. Data from accelerometers and gyroscopes can also be used to increase the precision of positional tracking.

Figure 3:
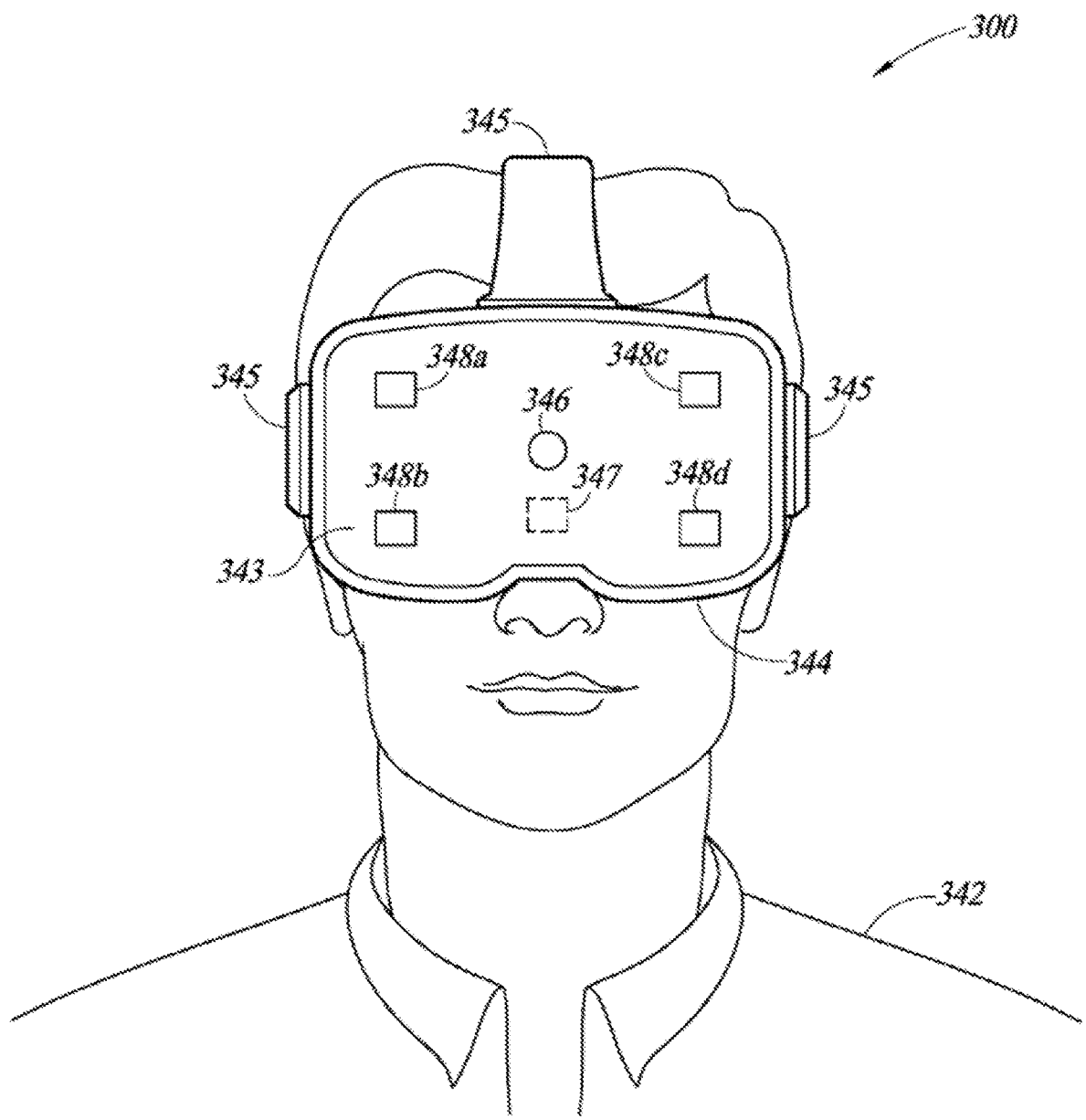
FIG. 3 is a front pictorial diagram of an embodiment of an HMD having binocular display subsystems.

FIG. 3 shows information 300 illustrating a front view of an example HMD device 344 when worn on the head of a user 342. The HMD device 344 includes a front-facing structure 343 that supports a front-facing or forward camera 346 and a plurality of sensors 348 *a*-348 *d* (collectively 348) of one or more types. As one example, some or all of the sensors 348 may assist in determining the location and/or orientation of the device 344 in space, such as light sensors to detect and use light information emitted from one or more external devices (not shown, e.g., base stations 214 of FIG. 2). As shown, the forward camera 346 and the sensors 348 are directed forward toward an actual scene or environment (not shown) in which the user 342 operates the HMD device 344. The actual physical environment may include, for example, one or more objects (e.g., walls, ceilings, furniture, stairs, cars, trees, tracking markers, or any other types of objects). The particular number of sensors 348 may be fewer or more than the number of sensors depicted. The HMD device 344 may further include one or more additional components that are not attached to the front-facing structure (e.g., are internal to the HMD device), such as an IMU (inertial measurement unit) 347 electronic device that measures and reports the HMD device's 344 specific force, angular rate, and/or the magnetic field surrounding the HMD device (e.g., using a combination of accelerometers and gyroscopes, and optionally, magnetometers). The HMD device may further include additional components that are not shown, including one or more display panels and optical lens systems that are oriented toward eyes (not shown) of the user and that optionally have one or more attached internal motors to change the alignment or other positioning of one or more of the optical lens systems and/or display panels within the HMD device, as discussed in greater detail below with respect to FIG. 4.

The illustrated example of the HMD device 344 is supported on the head of user 342 based at least in part on one or more straps 345 that are attached to the housing of the HMD device 344 and that extend wholly or partially around the user's head. While not illustrated here, the HMD device 344 may further have one or more external motors, such as attached to one or more of the straps 345, and automated corrective actions may include using such motors to adjust such straps in order to modify the alignment or other positioning of the HMD device on the head of the user. It will be appreciated that HMD devices may include other support structures that are not illustrated here (e.g., a nose piece, chin strap, etc.), whether in addition to or instead of the illustrated straps, and that some embodiments may include motors attached one or more such other support structures to similarly adjust their shape and/or locations to modify the alignment or other positioning of the HMD device on the head of the user. Other display devices that are not affixed to the head of a user may similarly be attached to or part of one or structures that affect the positioning of the display device, and may include motors or other mechanical actuators some embodiments to similarly modify their shape and/or locations to modify the alignment or other positioning of the display device relative to one or more pupils of one or more users of the display device.

Figure 4:
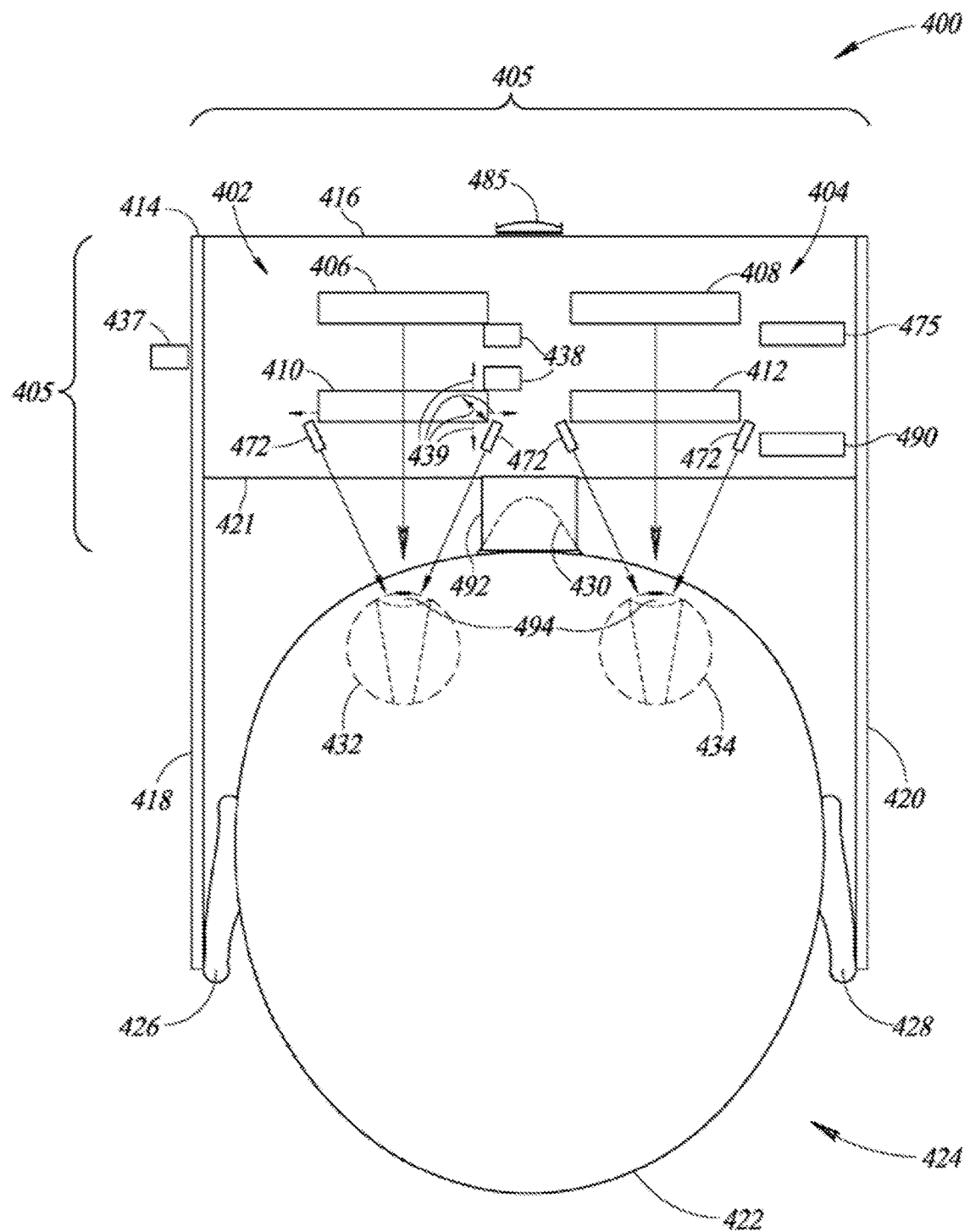
FIG. 4 illustrates a top plan view of an embodiment of an HMD having binocular display subsystems and various sensors.

FIG. 4 illustrates a simplified top plan view 400 of an embodiment of an HMD device 405 that includes a pair of near-to-eye display systems 402 and 404. The HMD device 405 may, for example, be the same or similar HMD devices illustrated in FIGS. 1-3 or a different HMD device, and the HMD devices discussed herein may further be used in the examples discussed further below. The near-to-eye display systems 402 and 404 of FIG. 4 include display panels 406 and 408, respectively (e.g., OLED micro-displays), and respective optical lens systems 410 and 412 that each have one or more optical lenses. The display systems 402 and 404 may be mounted to or otherwise positioned within a housing (or frame) 414, which includes a front-facing portion 416 (e.g., the same or similar to the front-facing surface 343 of FIG. 3), a left temple 418, right temple 420 and interior surface 421 that touches or is proximate to a face of a wearer user 424 when the HMD device is worn by the user. The two display systems 402 and 404 may be secured to the housing 414 in an eye glasses arrangement which can be worn on the head 422 of a wearer user 424, with the left temple 418 and right temple 420 resting over the user's ears 426 and 428, respectively, while a nose assembly 492 may rest over the user's nose 430. In the example of FIG. 4, the HMD device 405 may be supported on the head of the user in part or in whole by the nose display and/or the right and left over-ear temples, although straps (not shown) or other structures may be used in some embodiments to secure the HMD device to the head of the user, such as the embodiments shown in FIGS. 2 and 3. The housing 414 may be shaped and sized to position each of the two optical lens systems 410 and 412 in front of one of the user's eyes 432 and 434, respectively, such that a target location of each pupil 494 is centered vertically and horizontally in front of the respective optical lens systems and/or display panels. Although the housing 414 is shown in a simplified manner similar to eyeglasses for explanatory purposes, it should be appreciated that in practice more sophisticated structures (e.g., goggles, integrated headband, helmet, straps, etc.) may be used to support and position the display systems 402 and 404 on the head 422 of user 424.

The HMD device 405 of FIG. 4 is arranged to present a virtual reality display to the user, such as via corresponding video presented at a display rate such as 30 or 60 or 90 frames (or images) per second. In some embodiments, the HMD device may present an augmented reality display to the user. Each of the displays 406 and 408 of FIG. 4 may generate light which is transmitted through and focused by the respective optical lens systems 410 and 412 onto the eyes 432 and 434, respectively, of the user 424. The pupil 494 aperture of each eye, through which light passes into the eye, will generally have a pupil size ranging from 2 mm (millimeters) in diameter in very bright conditions to as much as 8 mm in dark conditions, while the larger iris in which the pupil is contained may have a size of approximately 12 mm—the pupil (and enclosing iris) may further move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 424 as images and/or video. In some implementations, the distance between each of the optical lens systems 410 and 412 and the user's eyes 432 and 434 may be relatively short (e.g., less than 30 mm, less than 20 mm), which advantageously causes the HMD device to appear lighter to the user since the weight of the optical lens systems and the display systems are relatively close to the user's face, and also may provide the user with a greater field of view. Some embodiments of an HMD device may include various additional internal and/or external sensors.

In FIG. 4, the HMD device 405 includes hardware sensors and additional components, such as to include one or more accelerometers and/or gyroscopes 490 (e.g., as part of one or more IMU units). Values from the accelerometer(s) and/or gyroscopes may be used to locally determine an orientation of the HMD device. In addition, the HMD device 405 may include one or more front-facing cameras, such as camera(s) 485 on the exterior of the front portion 416, and whose information may be used as part of operations of the HMD device, such as for providing AR functionality or positioning functionality. Furthermore, the HMD device 405 may further include other components 475 (e.g., electronic circuits to control display of images on the display panels 406 and 408, internal storage, one or more batteries, position tracking devices to interact with external base stations, etc.). Some embodiments may not include one or more of the components 475, 485 and/or 490. Some embodiments of an HMD device may include various additional internal and/or external sensors, such as to track various other types of movements and position of the user's body, eyes, controllers, etc.

The HMD device 405 further includes hardware sensors and additional components that may be used for determining user pupil or gaze direction, which may be provided to one or more components associated with the HMD device for use. The hardware sensors include one or more eye tracking assemblies 472 of an eye tracking subsystem that are mounted on or near the display panels 406 and 408 and/or located on the interior surface 421 near the optical lens systems 410 and 412 for use in acquiring information regarding the actual locations of the user's pupils 494, such as separately for each pupil in this example.

Each of the eye tracking assemblies 472 may include one or more light sources (e.g., IR LEDs) and one or more light detectors (e.g., silicon photodiodes). Further, although only four total eye tracking assemblies 472 are shown in FIG. 4 for clarity, it should be appreciated that in practice a different number of eye tracking assemblies may be provided. In some embodiments, a total of eight eye tracking assemblies 472 are provided, four eye tracking assemblies for each eye of the user 424. Further, in some embodiments, each eye tracking assembly includes a light source directed at one of the user's 424 eyes 432 and 434, a light detector positioned to receive light reflected by the respective eye of the user, and a polarizer positioned and configured to prevent light that is reflected via specular reflection from being imparted on the light detector.

Information from the eye tracking assemblies 472 may be used to determine and track the user's gaze direction during use of the HMD device 405. Furthermore, in some embodiments, the HMD device 405 may include one or more internal motors 438 (or other movement mechanisms) that may be used to move 439 the alignment and/or other positioning (e.g., in the vertical, horizontal left-and-right and/or horizontal front-and-back directions) of one or more of the optical lens systems 410 and 412 and/or display panels 406 and 408 within the housing of the HMD device 405, such as to personalize or otherwise adjust the target pupil location of one or both of the near-to-eye display systems 402 and 404 to correspond to the actual locations of one or both of the pupils 494. Such motors 438 may be controlled by, for example, user manipulation of one or more controls 437 on the housing 414 and/or via user manipulation of one or more associated separate I/O controllers (not shown). In some embodiments the HMD device 405 may control the alignment and/or other positioning of the optical lens systems 410 and 412 and/or display panels 406 and 408 without such motors 438, such as by use of adjustable positioning mechanisms (e.g., screws, sliders, ratchets, etc.) that are manually changed by the user via use of the controls 437. While the motors 438 are illustrated in FIG. 4 for only one of the near-to-eye display systems, each near-to-eye display system may have its own one or more motors, and, in some embodiments, one or more motors may be used to control (e.g., independently) each of multiple near-to-eye display systems.

In some embodiments, other types of display systems may be used, including with a single optical lens and display device, or with multiple such optical lenses and display devices. Non-exclusive examples of other such devices include cameras, telescopes, microscopes, binoculars, spotting scopes, surveying scopes, etc. Additionally, a wide variety of display panels or other display devices that emit light to form images may be used, which one or more users view through one or more optical lens. In some embodiments, a user may view one or more images through one or more optical lens that are produced in a manner other than via a display panel, such as on a surface that reflects light from another light source in part or in whole.

A. Eye Tracking Using IR Images

Figure 5:
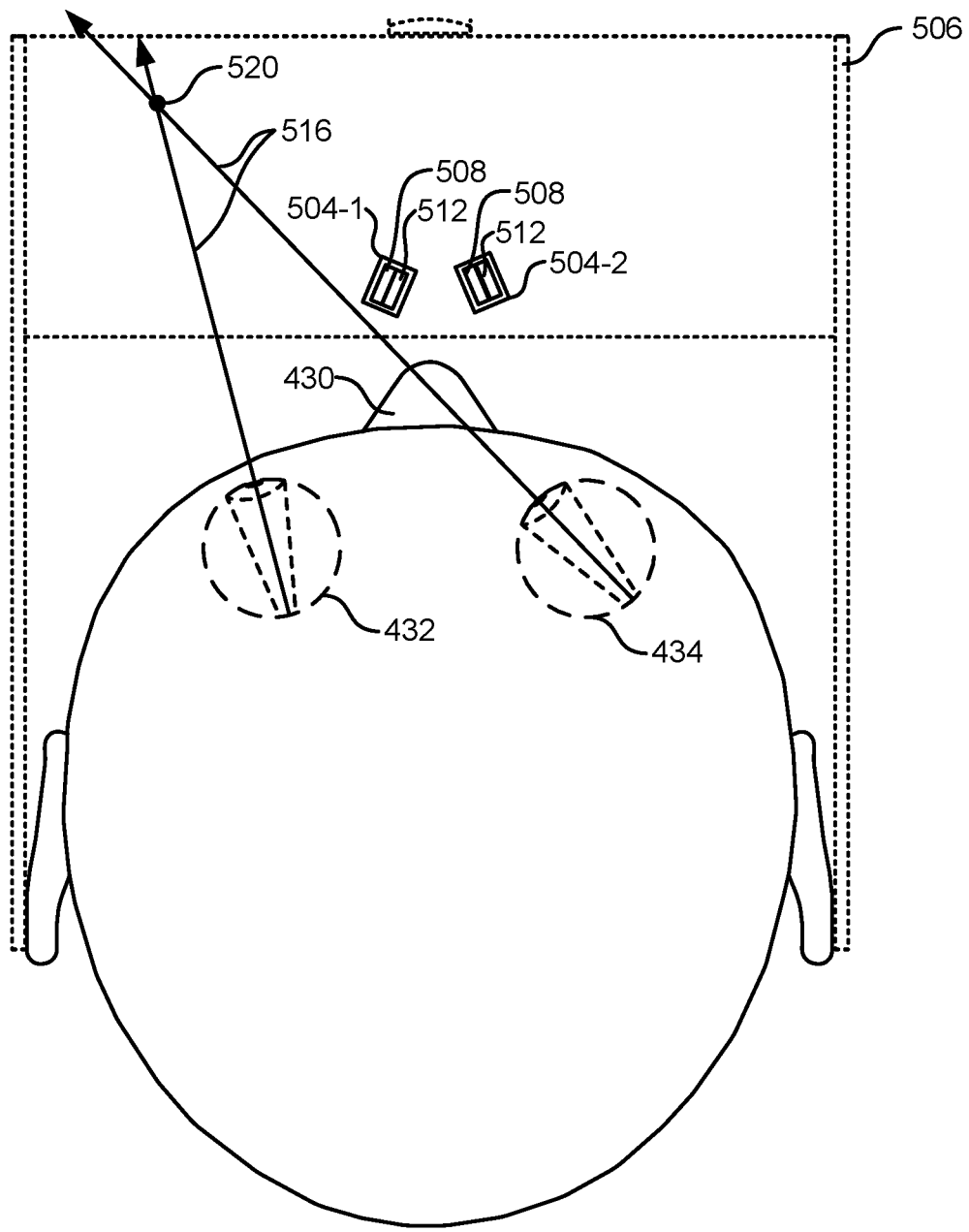
FIG. 5 depicts an embodiment of a system for estimating gaze direction using an image of an eye.

FIG. 5 depicts an embodiment of a system for estimating gaze direction using an image of an eye. The system comprises an eye-tracking assembly 504 integrated in an HMD device 506. The HMD device 506 in FIG. 5 is similar to the HMD device 405 in FIG. 4, but many of the details of the HMD device 506 are removed in FIG. 5 for clarity and simplicity.

The eye-tracking assembly 504 comprises a light source 508 and a camera 512. The light source 508 is co-located with the camera 512 (e.g., in the eye-tracking assembly 504). A first eye-tracking assembly 504-1 is used to track eye 432, and a second eye-tracking assembly 504-2 is used to track eye 434.

The camera 512 is positioned in an eye tube in an aperture of the HMD device 506. In some configurations, the eye-tracking assembly 504 is located behind an optical element (e.g., behind optical lens system 410 in FIG. 4). In some configurations, the camera 512 is positioned near the nose 430 of the user and points upward toward the eye. Placing the camera 512 near the nose 430 can provide a clean image of the eye.

In some embodiments, the camera 512 is coaxial with light from the light source 508, and/or an optical axis of the camera 512 is parallel to an optical axis of the light source 508. In some configurations, an optical axis of the camera 512 and/or an optical axis of the light source 508 is a straight line to the eye (e.g., no bends or reflections along an optical path toward the eye). In some embodiments, the camera 512 and the light source 508 are close to each other (e.g., touching; and/or the camera 512 is no more than 1, 5, 10, or 20 mm away from the light source 508).

Features of the eye (e.g., pupil, iris, eyelid(s), sclera, etc.) can be used to calculate a gaze vector 516 of the eye. The gaze vector 516 is an estimate of gaze direction of the user. In some embodiments, the gaze vector 516 is a probability distribution. In some embodiments, machine learning is used to calculate the gaze vector 516. For example, images of the eye 432 (e.g., training images) can be acquired by the camera 512 while the eye 432 is illuminated by the light source 508, and while the user is asked to look at a point 520 presented on a display of the HMD device 506. The point 520 can be a rendered point to appear at a long distance from the eye 432, so the point 520 need not be confined within the physical footprint of the HMD device 506. A machine-learning algorithm is run with training images of the eye and known location of the rendering point at the time the training images are acquired as inputs. Model data is output from the machine-learning algorithm.

In use, images of the eye (e.g., calibration images) are acquired by the camera 512, compared to the model data, and a gaze vector 516 calculated based on images of the eye being compared to the model data. In some embodiments, multiple images and/or previous gaze vector estimation(s) are used for predicting a current gaze vector. For example, if an immediately prior gaze vector was pointing to the left of the user, and the model data predicted probabilities for the current gaze vector that could be to the left or to the right of the user, the probabilities to the right could be given less weight since the user was likely just looking to the left. Accordingly, estimating the current gaze direction can be based on using a plurality of images.

Overlays can be used to estimate the gaze vector 516. In some embodiments, an overlay is a two-dimensional plane at a known rendering distance from the user. If a user clicks on an icon of the overlay, then the system can use the distance to the plane for estimating the gaze vector 516. In some embodiments, texture is provided on the overlay, and the system can obtain three-dimensional information about gaze as the user interacts with the overlay.

Figure 6:
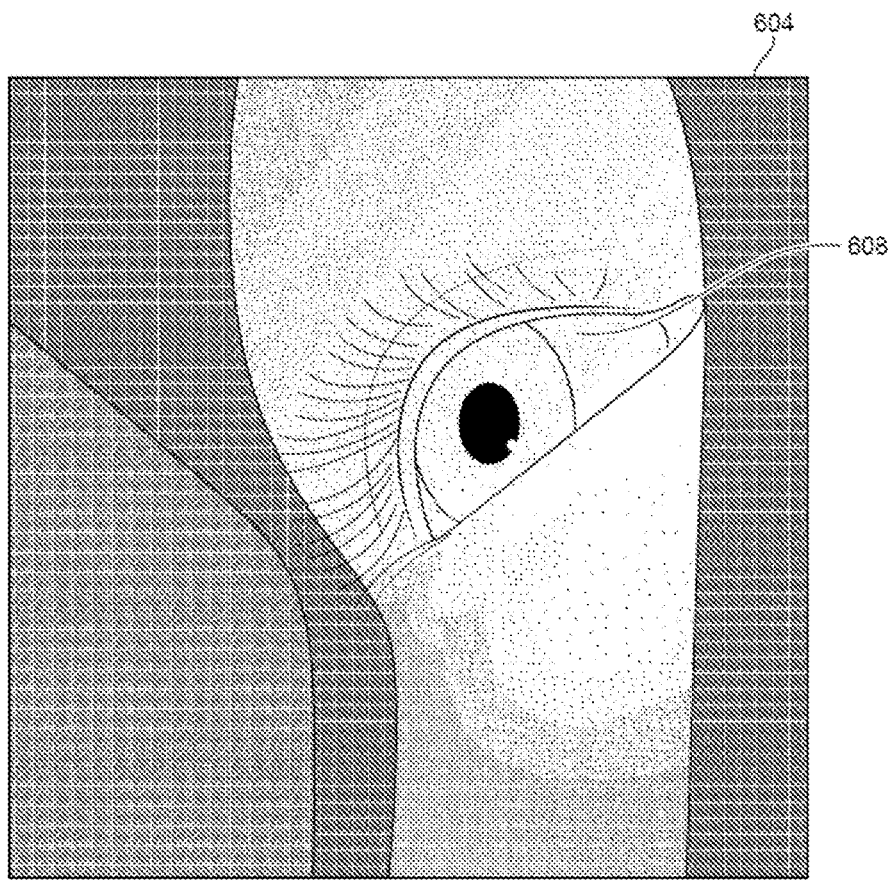
FIG. 6 depicts an embodiment of an image of an eye used for estimating gaze direction.

FIG. 6 depicts an embodiment of an image 604 of an eye 608 used for estimating gaze direction. The light source 508 of FIG. 5 emits light outside the visible spectrum (e.g., in the infrared) so as to not distract a user of the HMD device 506 while the user is observing images presented to the user by a display of the HMD device 506. Accordingly, in some embodiments, the camera images light in the infrared from the light source (e.g., in the near infrared; between 780 nm and 2500 nm).

The eye 608 is broadly illuminated (e.g., as opposed to illuminated by one or more points, such as used in glint detection and tracking). In some embodiments, broadly illuminated means an area illumination that fills the area of the eye with light. In some embodiments, the eye is evenly illuminated (e.g., one portion of illumination is not more than 2×, 3×, or 4× in intensity than another portion of illumination). Broadly illuminating the eye, and using images of the eye broadly illuminated, can have increased accuracy over glint detection for people who have had modifications to their eye, such as cornea surgery, and/or for people who wear corrective lenses, such as glasses or contacts.

Illumination and/or images of the eye includes multiple features of the eye, including the pupil and eye lid. For example, calculation of the gaze vector can be based on openness of the eye (e.g., based on an image of the eye lids) and/or an estimated location of the pupil in one or more images. Accordingly, in some embodiments, the image of the eye includes an image of an eyelid, and/or the gaze direction is at least partially calculated by a position of the eyelid in the image of the eye.

In some embodiments, prediction of gaze directions can be calculated as probability distributions. For example, if the eye is closed and/or obscured, the system can indicate the gaze direction is not known, or not known to a certain degree, by predicting a wide probability distribution of the gaze vector (e.g., a distribution with very large variance and/or arbitrary mean).

In some configurations, the eye is directly illuminated. For example, there are no bends in an optical path from light source to the eye. The camera is co-located with light source, so the camera has a direct view of the eye (e.g., no bending of the optical path from the eye to the camera). The illumination source and camera are near a nose of the user, which can provide a direct view of the eye.

Figure 7:
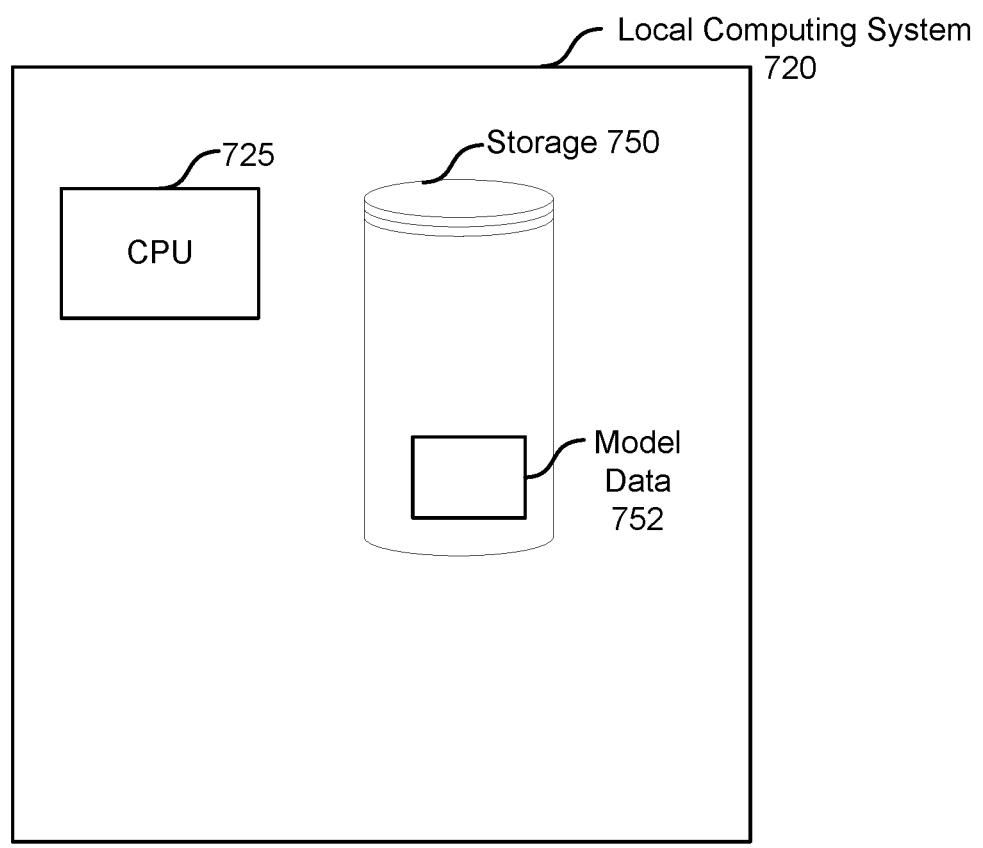
FIG. 7 depicts an embodiment of a local computing system for storing model data used for estimating gaze direction.

FIG. 7 depicts an embodiment of a local computing system 720 storing data used for estimating gaze direction. The local computing system 720 can comprise one or more features of the local computing system 120 in FIG. 1. The local computing system 720 comprises CPU 725, storage 750, and model data 752 contained in storage 750. Though storage 750 and model data 752 are shown as part of the local computing system 720 in FIG. 7, storage 750 and/or model data 752 can be part of a remote computer.

The model data 752 is from a machine-learning model, in some configurations. The model data 752 can be accessed by the CPU 725 or another processor. The machine-learning model can be developed by processing training data. Training data can include a plurality of pictures of eyes (from one or more users during training) and corresponding directions the eyes are likely looking in the plurality of pictures. For example, users during training are instructed to look at one or more rendering points presented on a display of an HMD device, the light source illuminates the eye of the user, and a camera acquires pictures of the illuminated eye (e.g., at a frame rate of 30, 60, 120, 150, or 300 frames per second). A large amount of data can be captured, and the rendering point is known in relation to a coordinate frame of the camera. The pictures and training data are provided as inputs (e.g., pictures and training data are time synced) to a machine-learning system, and model data 752 is produced by the machine-learning system, based on the plurality of pictures and training data. This can be considered a factory calibration.

In some configurations, data is fused and/or assumptions or constraints are used (e.g., as inputs to the machine learning system). For example, one assumption (in the machine-learning system or when calculating the gaze vector) that is used is that the two eyes of the user do not vertically separate. Thus, if a gaze vector for a first eye has a high confidence, the gaze vector for the first eye can be used in calculating the gaze vector for the second eye (e.g., to give lower probabilities to vectors that would result in the user having split vertical vision). In some embodiments, data from both eyes is fused so that gaze vectors for both eyes are calculated concurrently and in relation to each other. For example, gaze vectors that would result in diverging focus can be given less weight or thrown out (e.g., the left eye looking 45 degrees to the left and the right eye looking 45 degrees to the right), even though probabilities for individual gaze vectors could be relatively high. Accordingly, a combined probability or confidence score can be calculated, and gaze vectors selected that increase a combined probability of gaze vectors or confidence score for both eyes.

In some configurations, the HMD device can have optical markers, and external cameras can track the HMD device (e.g., by imaging the optical markers) as the plurality of pictures are acquired for training. In some configurations, a contrasting board, such as a chess board can be presented to find the relationship between an eye of a user for training and a relationship to the HMD device. Tracking the HMD device can provide data about head movement of the user in relation eye movement.

In some configurations, model data is refined during factory calibration and/or by a user after factor calibration based on a user interacting with one or more graphics presented on the display. For example, it can be assumed that the user is looking at an arrow while the user clicks to select an object the arrow is pointing at. Thus, model data can be generated each time a user interacts with some type of selection or interaction with a rendered overlay (e.g., an image of the eye is acquired and associated with a gaze direction to generate training data).

Figure 8:
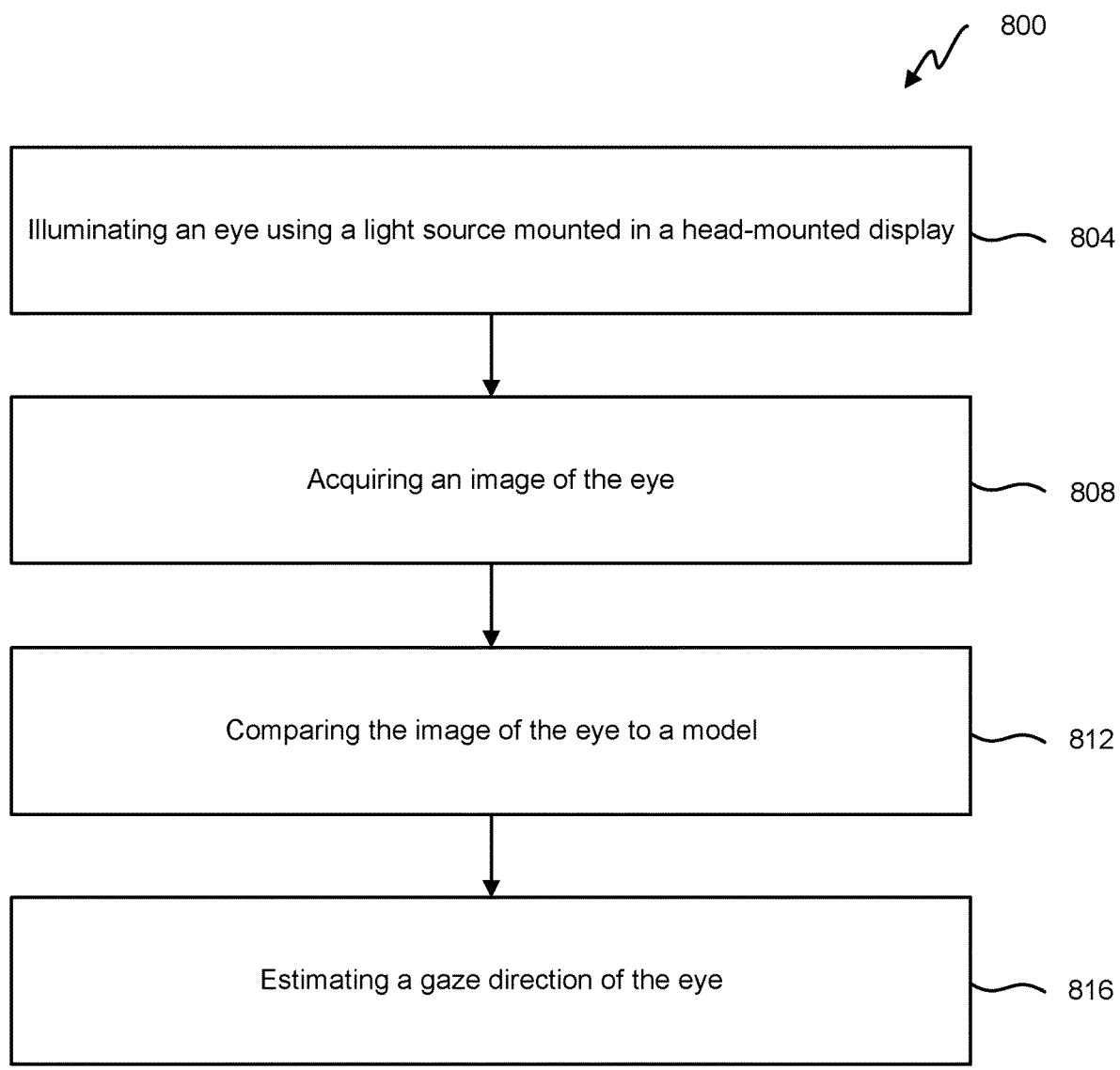
FIG. 8 illustrates a flowchart of an embodiment of a process for eye tracking in a head-mounted display.

FIG. 8 illustrates a flowchart of an embodiment of a process 800 for eye tracking in a head-mounted display. Process 800 begins in step 804 with illuminating an eye, using a light source mounted in the head-mounted display. For example, light source 508 is used to illuminate eye 432 and/or 434 in FIG. 5. In step 808, one or more images are acquired of one or both eyes using one or more cameras mounted in the head-mounted display, while the eye is illuminated using the light source (e.g., camera 512 in FIG. 5 is used to acquire images of eye 432 and/or eye 434). In step 812, the image of the eye is compared to a model. For example, an image of the eye 432 is compared to model data 752 in FIG. 7. In step 816 a gaze direction of the eye is estimated in relation to the head-mounted display based on comparing the image of the eye to the model. For example, the image is compared to model data to calculate one or more probabilities of gaze vector 516 in FIG. 5, and the gaze vector 516 with the highest probability is selected.

In some embodiments, the method comprises training a model (e.g., a machine-learning model), wherein training the model comprises having a person look at one or more known rendering points while acquiring images of an eye, and/or the person is instructed to follow, with the person's eyes, the one or more known rendering points.

In some embodiments, a method for eye tracking in a head-mounted display comprises illuminating an eye, using a light source mounted in the head-mounted display; acquiring an image of the eye, using a camera mounted in the head-mounted display, while the eye is illuminated using the light source; comparing the image of the eye to a model; and/or estimating a gaze direction of the eye in relation to the head-mounted display based on comparing the image of the eye to the model. In some embodiments, the model is a machine-learning model; the method comprises accessing the machine-learning model; the method comprises; training the model, wherein training the model comprises having a person look at one or more known rendering points while acquiring images of the eye of the person; the camera images light from the light source in the infrared; an optical axis of the camera is parallel to an optical axis of light source; an optical axis of the camera is a straight line to the eye; the image of the eye is one of a plurality of images, and estimating the gaze direction is based on using the plurality of images; the image of the eye includes an image of an eyelid; and/or the gaze direction is at least partially estimated by a position of the eyelid in the image of the eye.

B. Eye Tracking Calibration

Though an eye tracker can be factory calibrated, there can be variations from user to user (e.g., scale-factor errors). Thus, it can be beneficial to calibrate (or re-calibrate) the eye tracking of an HMD device for each user as the user uses the HMD device (e.g., "on-the-fly"). One calibration technique is to calibrate bias of eye tracking when a user clicks on an object position that is known in the virtual space of the HMD device.

A second calibration technique is to compare head rotation to eye rotation while the user is focused on a static object in virtual or real space. When focused on a static object and the head is moved, angular rate of the eye will match the negative of angular rate of the HMD device (e.g., equal and opposite so that the ratio is equal to −1). If the ratio is not equal to −1, then that information can be used to adjust calibration for the user. For example, if the ratio is −1.1, then eye tracking could be underestimating gaze direction by a factor of 10%.

Figure 9:
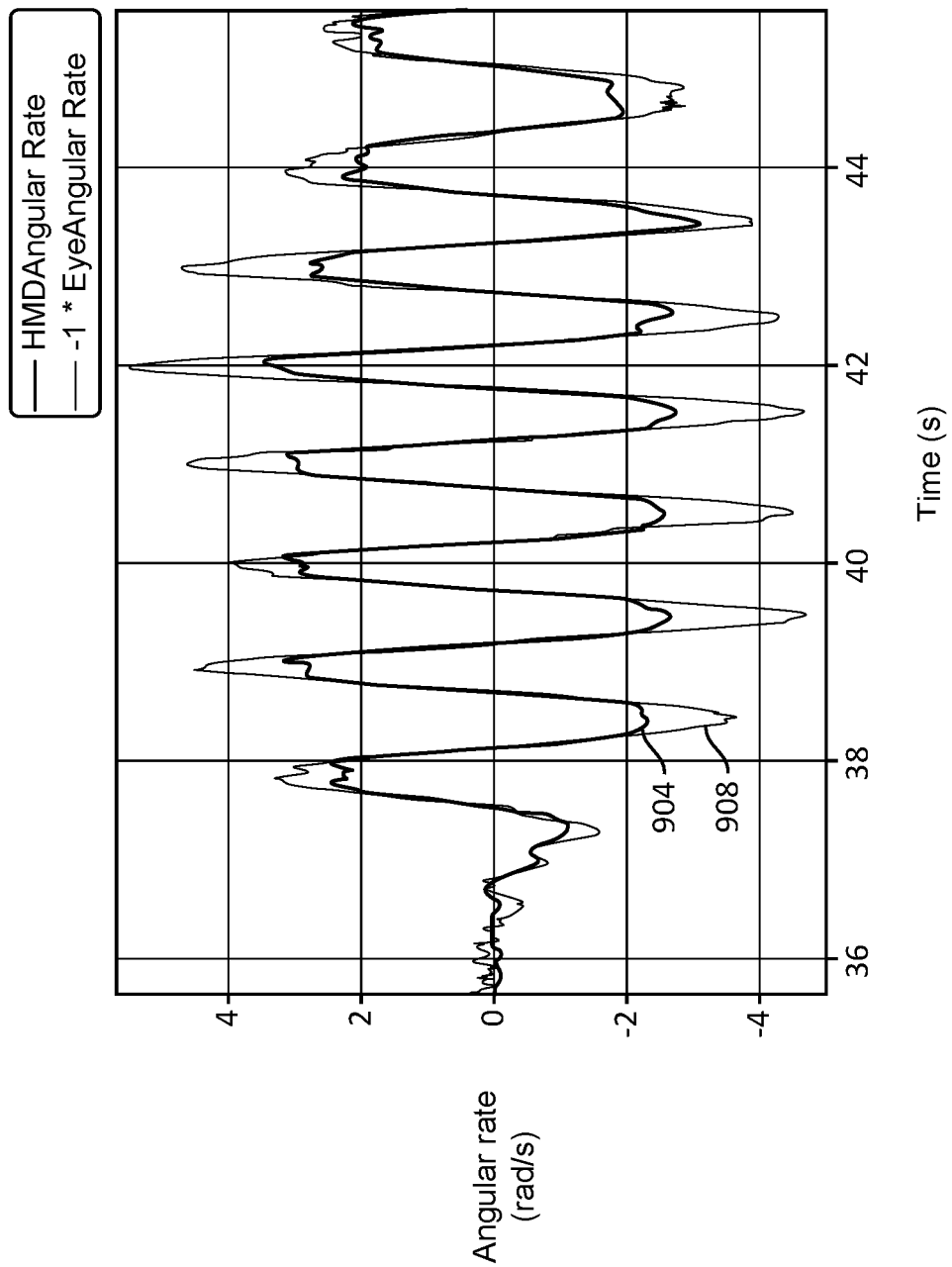
FIG. 9 depicts an embodiment of a comparison of head movement to the negative of eye movement.

FIG. 9 depicts an embodiment of a comparison of head movement to the negative of eye movement (e.g., for calibrating an eye tracker on-the-fly). FIG. 9 is a graph of angular velocity 904 of an HMD device (i.e., the angular velocity of the person's head) and the angular velocity 908 of the person's eyes while the person is shaking his head left and right while wearing the HMD device and focusing on a static object presented on a display of the HMD device. The angular velocity of the HMD device is well correlated with the negative angular velocity of the person's eyes.

If the person is looking at the static object in the head-mounted display, then the angular rates will be exactly opposite. Stated another way: at a point in time, the ratio of (−1*the angular velocity 908 of the eye)/(the angular velocity 904 of the HMD device)=1. A deviation from this is a "scale error" in the motion of the eye, where the eye tracker is either under- or over-estimating the magnitude of eye motion.

In FIG. 9, angular velocities 904 and 908 show stronger correlation near the middle of the graph, which corresponds to a center of a field of view of the person with respect to the head-mounted display. The eye tracker is underestimating how far the gaze of the person is as the eyes of the person slew from left to right and right to left.

Angular velocity 908 of the eyes can be calculated using images and estimated gaze vectors. Angular velocity of the HMD device can be calculated using one or more inertial measurement units (IMUs).

In some configurations, there are two aspects of eye tracking correction: 1) error in eye tracking; and 2) error caused from user discomfort. If a user is asked to view beyond about 20 degrees from center, the user might under look there. For example, if a user is asked to look at points around an extremity of a field of view to calibrate eye tracking, then the user might under look at extreme points because it can be uncomfortable, and the calibration can be less reliable. In some configurations, comparing angular velocities 904 and 908 provides more accurate and more comfortable calibration for a user.

In some calibration situations, center gaze is calibrated separately from calibrating peripheral gaze farther from center. For example, gaze direction outside 20 degrees from center is calibrated differently from gaze within 20 degrees.

Figure 10:
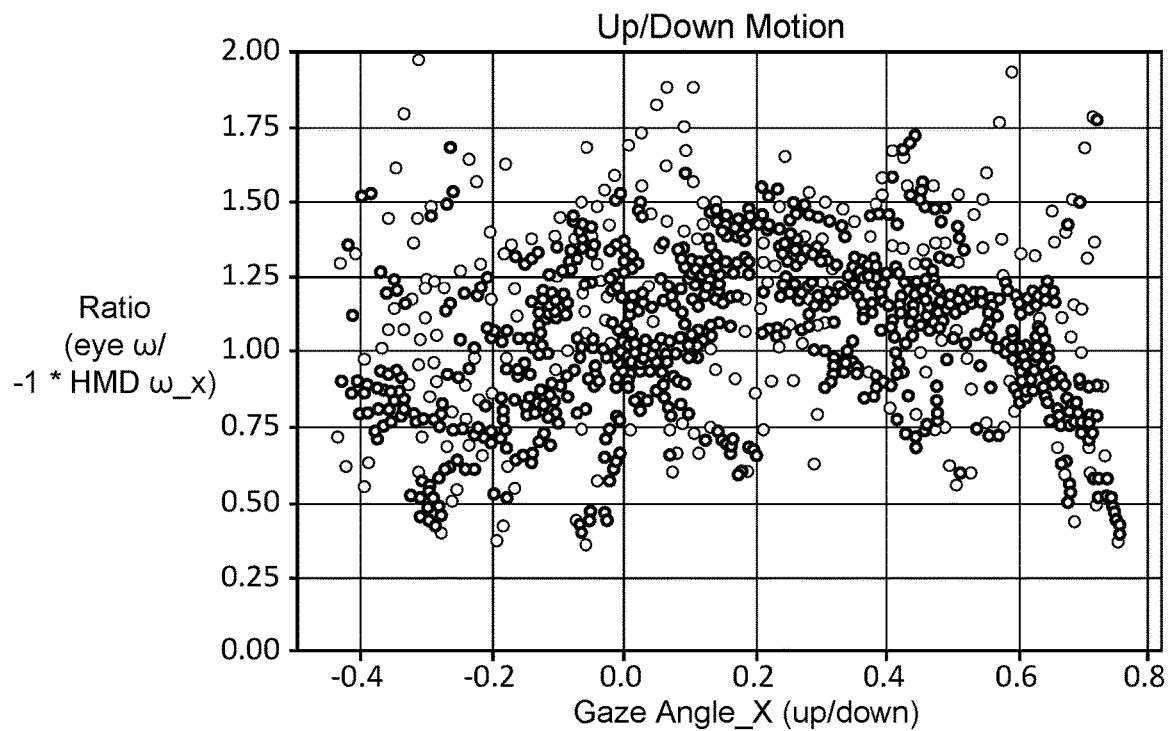
FIG. 10 depicts an embodiment of a plot diagram of ratios of angular rates of eye motion to head motion for up and down movement.

FIG. 10 depicts an embodiment of a plot diagram of ratios of angular rates of eye motion to head motion for up and down movement. In FIG. 10, the x axis is vertical gaze angle with zero looking straight forward, and the y axis is a ratio of angular velocity (ω) of the eyes to the negative angular velocity of the HMD device. While there is some noise, there are areas where the ratio is not equal to 1, and the "scale" differs depending on eye angle, with greater divergence from 1 the further from center.

Figure 11:
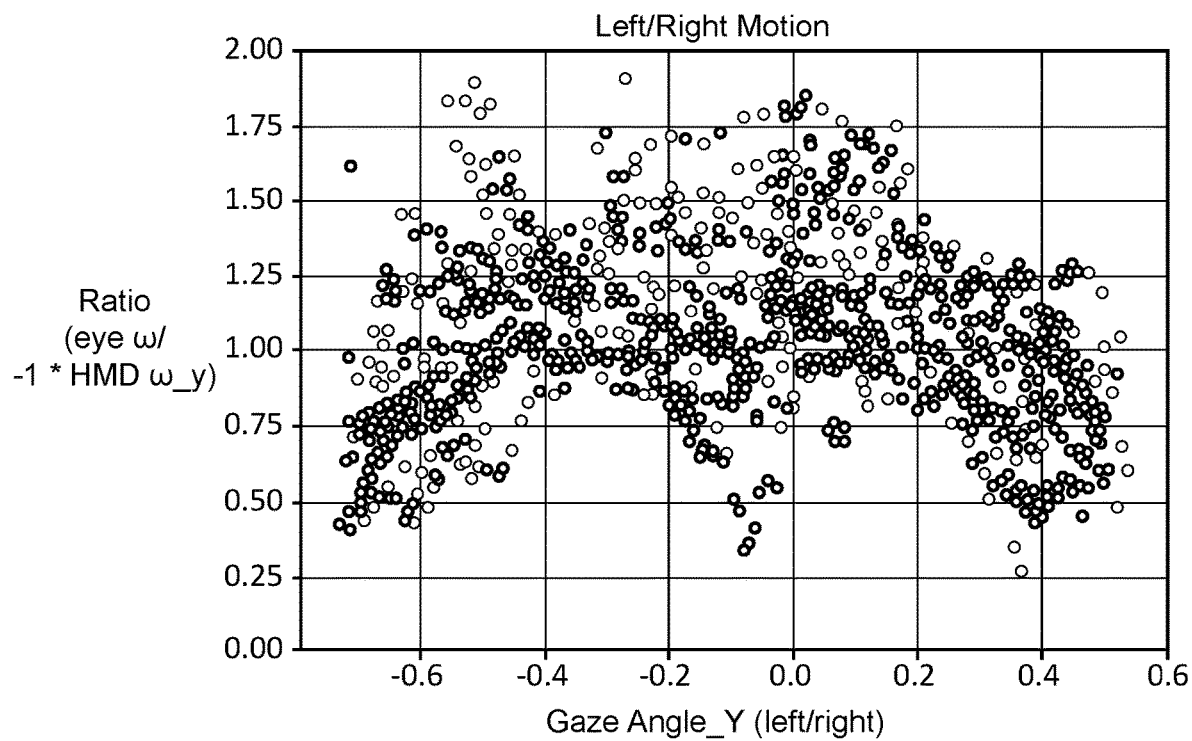
FIG. 11 depicts an embodiment of a plot diagram of ratios of angular rates of eye motion to head motion for left and right movement.

FIG. 11 depicts an embodiment of a plot diagram of ratios of angular rates of eye motion to head motion for left and right movement. In FIG. 11, the x axis is horizontal gaze angle with zero looking straight forward, and the y axis is the ratio of angular velocity of the eyes to the negative angular velocity of the HMD device. While there is some noise, there are areas where the ratio is not equal to 1, and that the "scale" differs depending on eye angle, with greater divergence from 1 the further from center.

Figure 12:
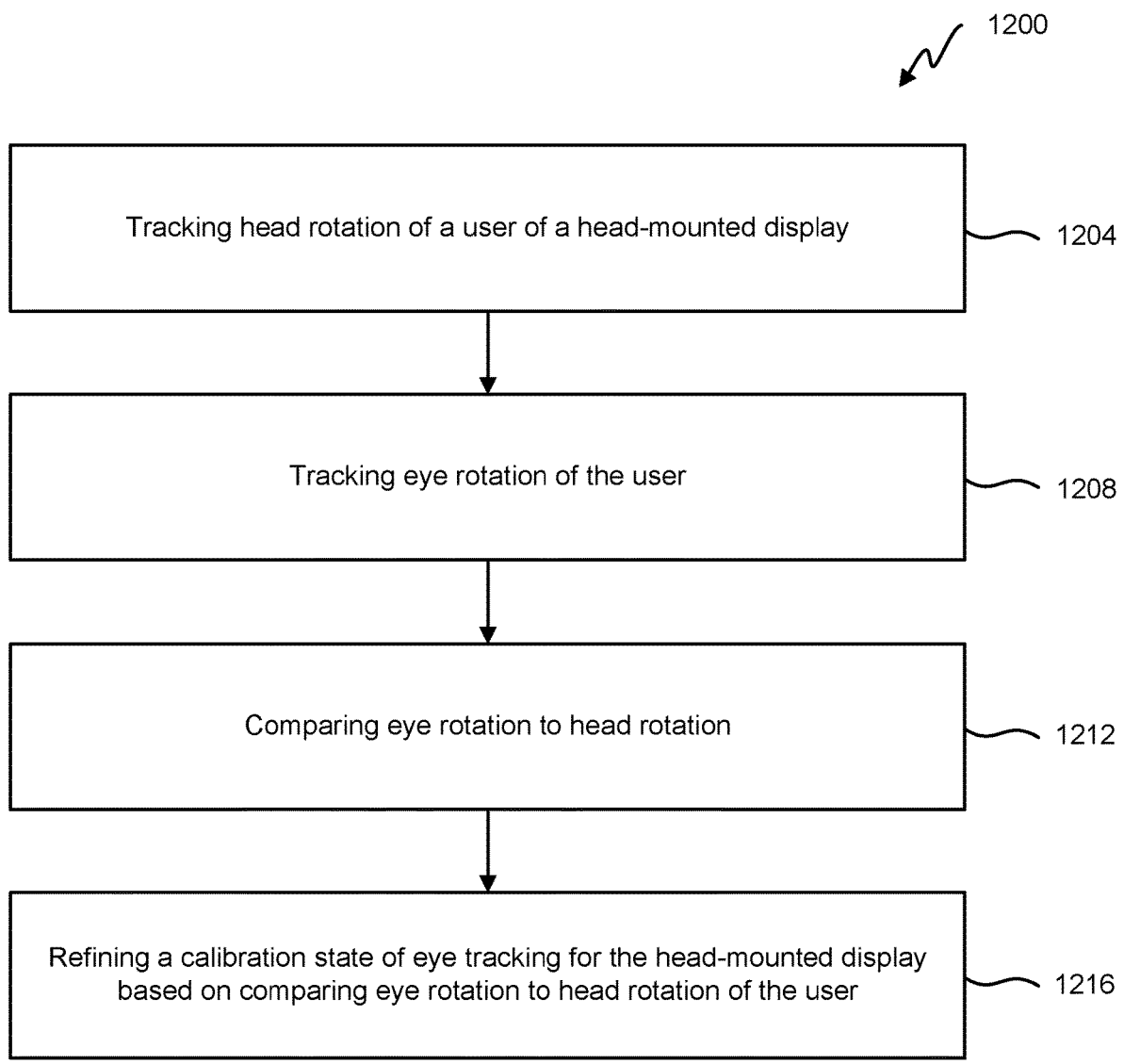
FIG. 12 illustrates a flowchart of an embodiment of a process for automatic field calibration for eye tracking in a head-mounted display.

FIG. 12 illustrates a flowchart of an embodiment of a process 1200 for automatic field calibration for eye tracking in the HMD device. Process 1200 begins in step 1204 with tracking head rotation of a user during a time period while the HMD device is worn by the user. For example, an IMU is used to track rotation of the HMD device. In some embodiments, the time period is equal to or greater than 1, 2, or 5 seconds and equal to or less than 10, 20, 30, or 60 seconds. In step 1208, eye rotation of the user is tracked during the time period. For example, images of the eyes of the user are used to estimate gaze vectors of the eyes during the time period. In some configurations, data is captured continuously, and an estimate is continuously refined. In some configurations, a combination of time and data collected is used for refining calibrations. For example, when rotations are above a threshold (e.g., in horizontal, vertical, or both horizontal and vertical directions), such as equal to or greater than 1.5, 2, 2.5, 3, or 4 radians per second and/or equal to or less than 6 radians per second, collected data is used for eye-tracking calibration.

In step 1212, eye rotation during the time period is compared to head rotation during the time period (e.g., similar to FIG. 9). In step 1216, a calibration state of eye tracking for the head-mounted display is refined (e.g., re-calibrated) based on comparing eye rotation of the user to head rotation of the user during the time period. For example, data from graphs similar to those in FIGS. 10 and 11 is used to refine the calibration of the eye tracking of the head-mounted display. The calibration state of the eye tracking of the head-mounted display comprises one or more parameters currently used to calculate the gaze vector to estimate gaze direction of the user.

In some embodiments, refining the calibration state is based on a comparison of a closeness of eye rotation equaling the negative of the head rotation (e.g., as shown in FIG. 9).

In some embodiments, a method for automatic field calibration for eye tracking in a head-mounted display comprises tracking head rotation of a user during a time period while the head-mounted display is worn by the user; tracking eye rotation of the user during the time period; comparing eye rotation of the user to head rotation of the user during the time period; and/or refining a calibration state of eye tracking for the head-mounted display based on comparing eye rotation of the user to head rotation of the user during the time period. In some embodiments, head rotation is measured using an inertial measurement unit in the head-mounted display; eye rotation is measured by estimating gaze direction from images acquired by a camera; and/or refining the calibration state is based on a comparison of closeness of eye rotation equaling the negative of the head rotation.

C. Predictive Gaze Direction for Improved Rendering

Figure 13:
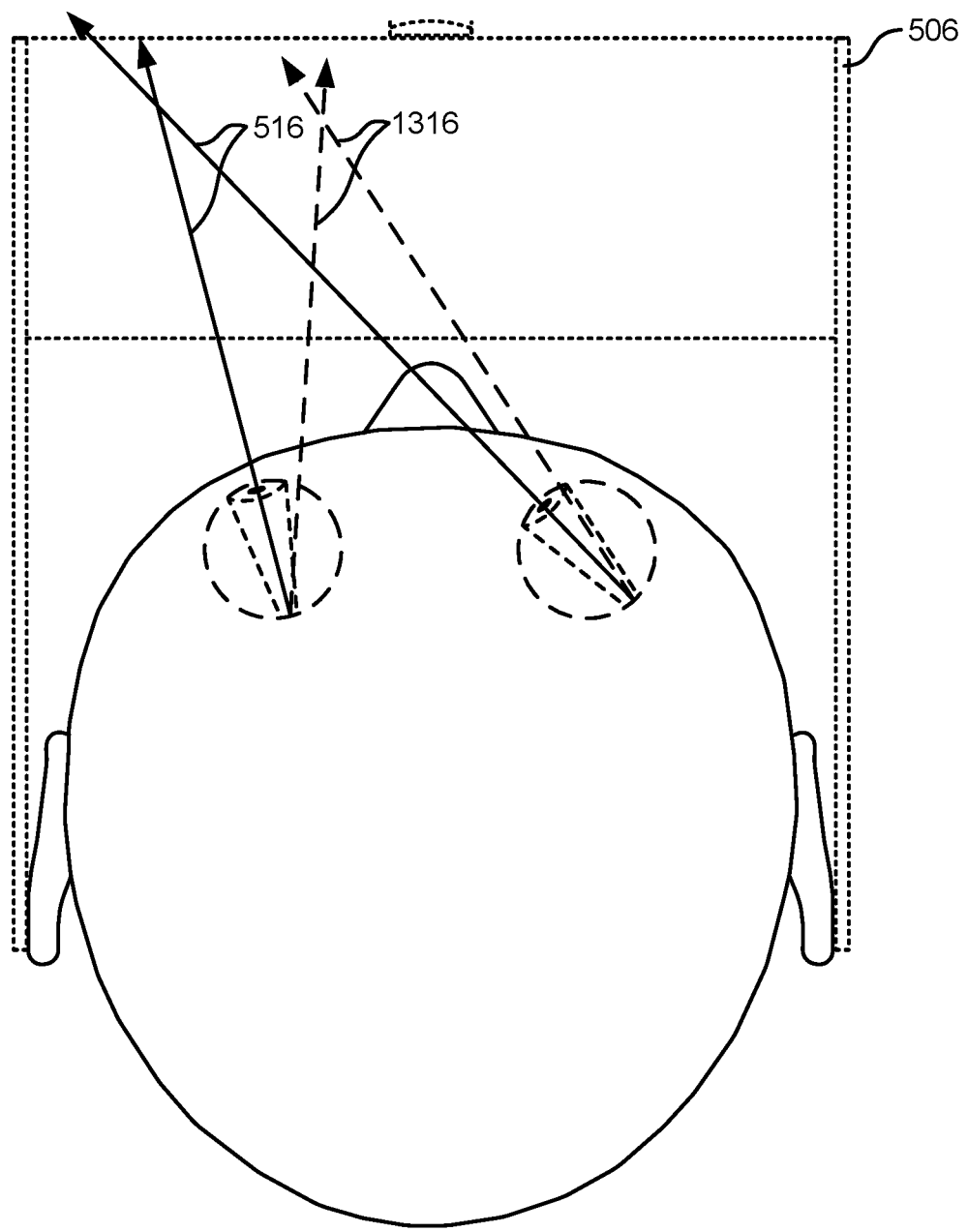
FIG. 13 depicts an embodiment of predicted gaze direction.

FIG. 13 depicts an embodiment of predicted gaze direction. FIG. 13 shows estimated gaze vector 516 (e.g., as estimated in FIG. 5) and predicted gaze vector 1316. The predicted gaze vector 1316 can be used to correct for stereo convergence for future rendering by a compositor of the HMD device. The HMD device receives developer data (e.g., z-buffer data from a game developer) to render on the head-mounted display. If rendering is based only on the estimated gaze vector 516, then the rendering can be a little off as the user's gaze direction changes. Instead of using just estimated gaze vector 516, predicted gaze vector 1316 is used in the rendering pipeline. Developer data, in some configurations, is z-buffer data that has RGB (Red-Green-Blue) values for each pixel in developer coordinates and rendering presents those pixels in x, y, z of the HMD device or "real" coordinates in relation to the user.

Using the predicted gaze vector 1316 can be helpful for foveated rendering (e.g., foveated transport). In foveated rendering, higher image resolution is provided at a center of the user's vision. For example, a center for rendering purposes is based on where the eye is looking. If the eye is no longer looking at the estimated gaze vector 516 direction, and the rendering is based on the estimated gaze vector 516, then the rendering will not be optimal. In some situations, it is not preferable to calculate rendering from a pose that is the current pose of the user. Instead, it can be preferable to predict a pose a number of frames in the future (e.g., wherein the number of frames in the future is equal to or greater than 1, 2, 3, 5, or 10 and/or equal to or less than 5, 7, 10, 15, 20, or 30). The number of future frames predicted into the future can vary based on application. Additionally demands for rendering verses transport can differ, with transport preferring more prediction. In some situations (e.g., rapt focus, still eyes), predicting more than 30 frames into the future is performed. For example, a user's gaze may be predicted, with perhaps lower confidence, 50, 100, 150 or more frames into the future. As rendering frame rate increases, the number of frames predicted into the future can also increase.

In some embodiments, given a history of where a user has been looking, the predicted gaze vector 1316 is calculated to predict where the user is likely to be looking in n number of frames in the future. In some embodiments, a machine-learning system is fed a stream of information about a user's head orientation, motion (e.g., angular velocity) of the user's head, gaze direction, and/or gaze angular velocity to calculate the predicted gaze vector 1316 and/or head orientation. The predicted gaze vector 1316 can be based on a probability distribution generated from the machine-learning system. For example, if the system knows the user is looking to the right and moving the head to the right, while looking at a static object, the system can predict where the user is going to be looking in future frames. In some situations, the system predicts that the user will look at another point before moving the user's head, if the head is stationary. In some embodiments, if there is a higher confidence in the prediction, then higher resolution will be used for that pose.

A machine-learning system can be trained using a variety of users (e.g., using an HMD device for the training). In some configurations, the machine-learning model is trained based on a type of application or type of action. For example, one model could be used for a user reading text, another model could be used for a survival first-person shooter game, and another model used for a virtual reality rhythm game. In some embodiments, the predicted gaze vector 1316 is calculated based on developer data. For example, if a significant event is happening (e.g., a zombie suddenly appearing), then the user is more likely to look at the location of the significant event.

Figure 14:
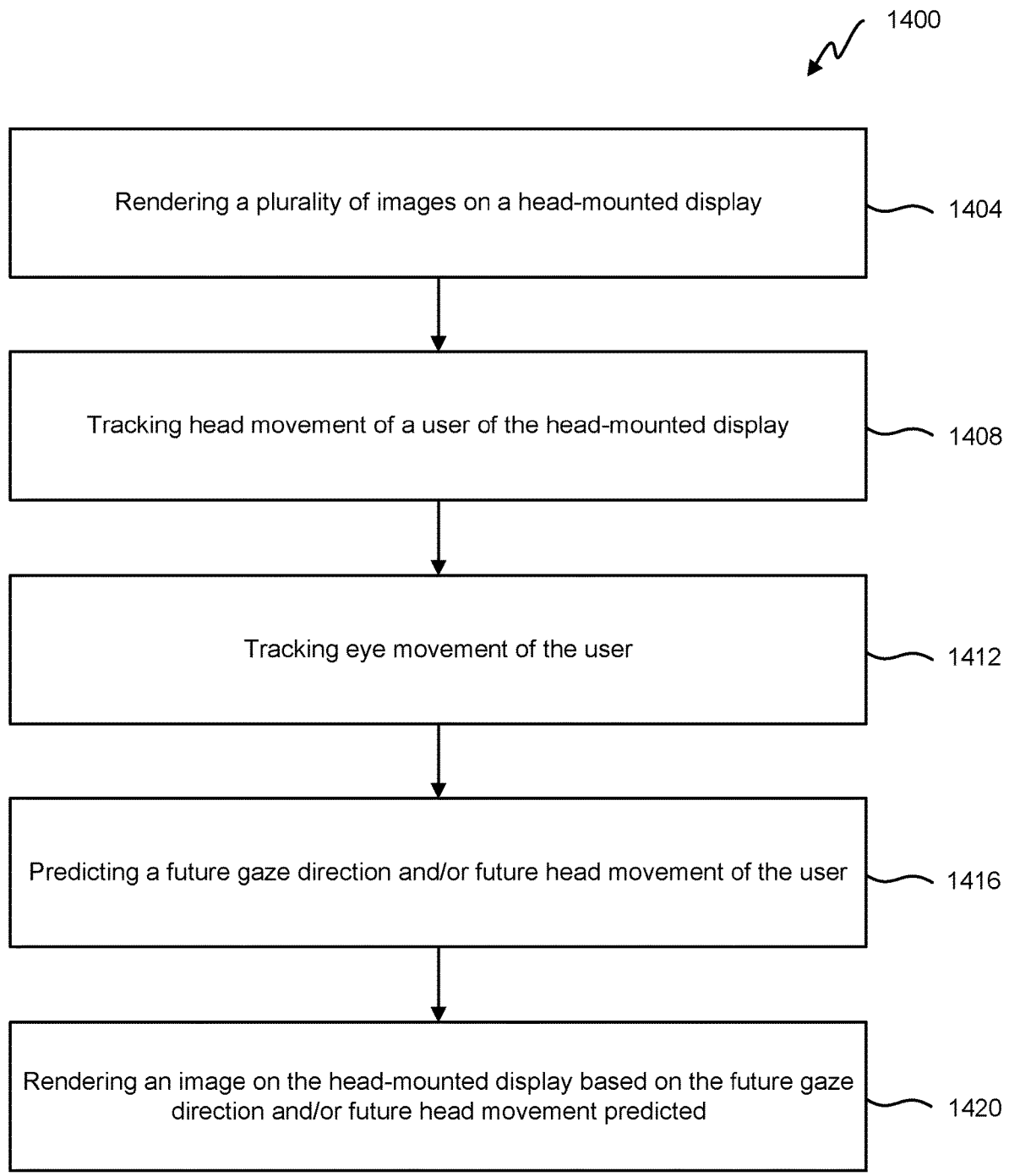
FIG. 14 illustrates a flowchart of an embodiment of a process for predicting future eye orientation with respect to a head-mounted display for graphic rendering.

FIG. 14 illustrates a flowchart of an embodiment of a process 1400 for predicting future eye orientation with respect to a head-mounted display for graphic rendering. Process 1400 begins with step 1404 with rendering a plurality of images on the head-mounted display. In step 1408 head movement of a user wearing the head-mounted display is tracked, in response to the plurality of images presented. In step 1412, eye movement of the user is tracked in response to the plurality of images presented. In step 1416 a future gaze direction (e.g., predicted gaze vector 1316 in FIG. 13) of the user, and/or a future head orientation of the user, is calculated based on tracking the head movement of the user and tracking the eye movement of the user in response to the plurality of images presented. In step 1420, an image on the head-mounted display is rendered based on the future gaze direction and/or based on the future orientation predicted.

In some embodiments, a method for predicting future eye orientation with respect to a head-mounted display for graphic rendering comprises rendering a plurality of images on the head-mounted display; tracking head movement of a user wearing the head-mounted display, in response to the plurality of images presented; tracking eye movement of the user in response to the plurality of images presented; predicting a future gaze direction of the user, and/or a future head orientation of the user, based on tracking the head movement of the user and tracking the eye movement of the user in response to the plurality of images presented; and/or rendering an image on the head-mounted display based on the future gaze direction and/or based on the future head orientation predicted.

The embodiments were chosen and described in order to explain the principles of the invention and practical applications to thereby enable others skilled in the art to best utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A system for automatic field calibration for eye tracking in a head-mounted display, the system comprising:
    the head-mounted display;
    an eye-tracking assembly that is part of the head-mounted display; and
    one or more memory devices comprising instructions that, when executed, cause one or more processors to perform operations comprising:
        tracking head rotation of a user during a time period while the head-mounted display is worn by the user;
        illuminating an eye using a light source mounted in the head-mounted display;
        acquiring an image of the eye, including an eyelid of the eye, using a camera of the eye-tracking assembly while the eye is illuminated using the light source;
        calculating a gaze vector using a position of the eyelid in the image of the eye;
        tracking eye rotation of the user during the time period, using the eye-tracking assembly and the gaze vector;
        comparing the eye rotation of the user to the head rotation of the user during the time period; and
        refining a calibration state of eye tracking for the head-mounted display based on comparing eye rotation of the user to head rotation of the user during the time period.

2. The system of claim 1, wherein:
    the system comprises an inertial measurement unit that is part of the head-mounted display; and
    tracking the head rotation is based on data received from the inertial measurement unit.

3. The system of claim 1, wherein:
    the head rotation is measured using an inertial measurement unit in the head-mounted display; and
    the eye rotation is measured by estimating gaze direction from images acquired by the camera.

4. The system of claim 1, wherein refining the calibration state is based on a comparison of closeness of eye rotation equaling the negative of the head rotation.

5. The system of claim 1, wherein calculating the gaze vector comprises:
comparing the image of the eye to a model; and
estimating a gaze direction of the eye in relation to the head-mounted display based on comparing the image of the eye to the model.

6. The system of claim 1, wherein the camera images light from the light source in the infrared.

7. The system of claim 1, wherein:
an optical axis of the camera is parallel to an optical axis of light source;
the light source and camera are arranged in the head-mounted display to be near a nose of the user; and
the camera is arranged to point upward, toward the eye of the user while the head-mounted display is worn by the user.

8. The system of claim 1, the instructions, when executed, cause the one or more processors to perform operations comprising:
rendering a plurality of images on the head-mounted display;
tracking head movement of the user wearing the head-mounted display, in response to the plurality of images presented;
tracking eye movement of the user in response to the plurality of images presented;
predicting a future gaze direction of the user, and/or a future head orientation of the user, based on tracking the head movement of the user and tracking the eye movement of the user in response to the plurality of images presented; and
rendering an image on the head-mounted display based on the future gaze direction and/or based on the future head orientation predicted.

9. A method for automatic field calibration for eye tracking in a head-mounted display, the method comprising:
tracking head rotation of a user during a time period while the head-mounted display is worn by the user;
illuminating an eye using a light source mounted in the head-mounted display;
acquiring an image of the eye, including an eyelid of the eye, using a camera while the eye is illuminated using the light source;
calculating a gaze vector using a position of the eyelid in the image of the eye;
tracking eye rotation of the user during the time period using the gaze vector;
comparing the eye rotation of the user to the head rotation of the user during the time period; and
refining a calibration state of eye tracking for the head-mounted display based on comparing eye rotation of the user to head rotation of the user during the time period.

10. The method of claim 9, wherein:
the head rotation is measured using an inertial measurement unit in the head-mounted display; and
the eye rotation is measured by estimating gaze direction from images acquired by the camera.

11. The method of claim 9, wherein refining the calibration state is based on a comparison of closeness of eye rotation equaling the negative of the head rotation.

12. The method of claim 9, wherein calculating the gaze vector comprises:
comparing the image of the eye to a model; and
estimating a gaze direction of the eye in relation to the head-mounted display based on comparing the image of the eye to the model.

13. The method of claim 12, wherein the model is a machine-learning model.

14. The method of claim 12, wherein:
the light source is arranged to evenly illuminate the eye with infrared light; and
the camera images light from the light source in the infrared.

15. The method of claim 12, wherein an optical axis of the camera is parallel to an optical axis of light source.

16. The method of claim 12, wherein an optical axis of the camera is a straight line to the eye.

17. The method of claim 9 comprising:
rendering a plurality of images on the head-mounted display;
tracking head movement of the user wearing the head-mounted display, in response to the plurality of images presented;
tracking eye movement of the user in response to the plurality of images presented;
predicting a future gaze direction of the user, and/or a future head orientation of the user, based on tracking the head movement of the user and tracking the eye movement of the user in response to the plurality of images presented; and
rendering an image on the head-mounted display based on the future gaze direction and/or based on the future head orientation predicted.

18. A memory device comprising instructions that, when executed, cause one or more processors to perform operations comprising:
tracking head rotation of a user during a time period while a head-mounted display is worn by the user;
illuminating an eye using a light source mounted in the head-mounted display;
acquiring an image of the eye, including an eyelid of the eye, using a camera while the eye is illuminated using the light source;
calculating a gaze vector using a position of the eyelid in the image of the eye;
tracking eye rotation of the user during the time period, using the gaze vector;
comparing the eye rotation of the user to the head rotation of the user during the time period; and
refining a calibration state of eye tracking for the head-mounted display based on comparing eye rotation of the user to head rotation of the user during the time period.

19. The memory device of claim 18, wherein:
the head rotation is measured using an inertial measurement unit in the head-mounted display; and
the eye rotation is measured by estimating gaze direction from images acquired by the camera.

20. The memory device of claim 18, wherein refining the calibration state is based on a comparison of closeness of eye rotation equaling the negative of the head rotation.

* * * * *